(12) United States Patent
Hwang

(10) Patent No.: US 11,763,034 B2
(45) Date of Patent: *Sep. 19, 2023

(54) METHOD AND SYSTEM FOR CONSTRUCTING VIRTUAL SPACE

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,763

(22) Filed: Mar. 31, 2022

(65) Prior Publication Data

US 2022/0222379 A1 Jul. 14, 2022

Related U.S. Application Data

(63) Continuation of application No. 16/885,445, filed on May 28, 2020, now Pat. No. 11,328,094.

(30) Foreign Application Priority Data

| Apr. 9, 2020 | (KR) | .......................... 1020200043237 |
| Apr. 9, 2020 | (KR) | .......................... 1020200043238 |
| Apr. 9, 2020 | (KR) | .......................... 1020200043239 |

(51) Int. Cl.
| G06F 21/62 | (2013.01) |
| G06F 21/10 | (2013.01) |
| G06T 11/00 | (2006.01) |

(52) U.S. Cl.
CPC .......... G06F 21/6263 (2013.01); G06F 21/10 (2013.01); G06T 11/00 (2013.01); *G06F 21/1015* (2023.08)

(58) Field of Classification Search
CPC ...... G06F 21/6263; G06F 11/00; G06F 21/10; G06F 2221/0713
See application file for complete search history.

(56) References Cited

U.S. PATENT DOCUMENTS

| 6,772,195 B1 * | 8/2004 | Hatlelid ............. G06F 3/04815 709/224 |
| 8,538,736 B1 | 9/2013 | Paquet |
| 9,101,261 B2 | 8/2015 | Kim et al. |
| 9,381,426 B1 | 7/2016 | Hughes et al. |
| 2006/0089543 A1 | 4/2006 | Kim et al. |
| 2008/0052242 A1 * | 2/2008 | Merritt .................... G06F 21/10 705/51 |
| 2012/0188233 A1 * | 7/2012 | Shuster .................. G06T 15/20 345/419 |
| 2013/0036372 A1 | 2/2013 | Priebe |

(Continued)

*Primary Examiner* — Ellen Tran
(74) *Attorney, Agent, or Firm* — McCormick, Paulding & Huber, PLLC

(57) ABSTRACT

Disclosed are a method and system for constructing a virtual space. The method of constructing a virtual space may include obtaining world information for generating a space of a virtual world, determining a location of an agent in the space of the virtual world, selecting a digital object capable of being displayed to the agent in the space of the virtual world based on the world information and the location of the agent, determining whether a display area of the selected digital object is present, and determining whether to display content through the display area based on a contract preset with respect to the display area.

19 Claims, 15 Drawing Sheets

(56) References Cited

U.S. PATENT DOCUMENTS

| | | |
|---|---|---|
| 2015/0231509 A1 | 8/2015 | McMain, II et al. |
| 2016/0012640 A1 | 1/2016 | Abraham |
| 2016/0035061 A1* | 2/2016 | Gadre .................. A63F 13/213 345/473 |
| 2017/0076011 A1 | 3/2017 | Gannon |
| 2018/0293402 A1* | 10/2018 | Bilotta ................. G06T 11/206 |

* cited by examiner

METHOD AND SYSTEM FOR CONSTRUCTING VIRTUAL SPACE

CROSS REFERENCE TO RELATED APPLICATION

This application is a continuation of U.S. patent application Ser. No. 16/885,445 filed on May 28, 2020, which claims priority under 35 U.S.C. § 119 to Korean Patent Application No. 10-2020-0043237 filed on Apr. 9, 2020, Korean Patent Application No. 10-2020-0043238 filed on Apr. 9, 2020, and Korean Patent Application No. 10-2020-0043239 filed on Apr. 9, 2020, each of which is incorporated herein by reference in its entirety.

BACKGROUND OF THE INVENTION

1. Technical Field

The following description relates to a method and system for constructing a virtual space.

2. Description of the Related Art

In the existing browser environment, a service provider that operates media providing services and a third party service provider, that is, an external service provider, separately record and use information on users using their cookies. For example, a third party service provider exposes information suitable for a user in real time through the medium of a service provider using programmatic bidding or real-time bidding (RTB) based on information obtained through cookies.

However, a virtual space has a problem in that it is difficult for a third party service provider to effectively collect and check experience information of a user because all the experiences of the user are performed in an environment based on the supplier of the virtual space. Accordingly, in a conventional technology, a third party service provider has a limit in that it exposes common information to a plurality of unspecified users regardless of the activities of a user simple in a virtual space or provide related information to a user based on information external to the activities of the user in a virtual space, such as the profile of the user.

PRIOR ART DOCUMENT

Korean Patent Application Laid-Open No. 10-2002-0007892

SUMMARY OF THE INVENTION

There can be provided a virtual space construction method and system for configuring a space of a virtual world of an agent.

There can be provided a content selection method and system for selecting content to be exposed through a display area present in a space of a virtual world using the tracking features of an agent in the space of the virtual world.

There can be provided a content provision method and system for providing, by an external service provider, content using the tracking features of an agent.

In an aspect, there is provided a method of constructing a virtual space. The method performed by a computer device includes obtaining, by at least one processor included in the computer device, world information for generating a space of a virtual world, determining, by the at least one processor, a location of an agent in the space of the virtual world, selecting, by the at least one processor, a digital object capable of being displayed to the agent in the space of the virtual world based on the world information and the location of the agent, determining, by the at least one processor, whether a display area of the selected digital object is present, and determining, by the at least one processor, whether to display content through the display area based on a contract preset with respect to the display area.

According to one aspect, the world information may include a map for the space of the virtual world, information on an object area where the digital object is located, and information on the digital object located in the object area. The world information may further include at least one of policy information on the space of the virtual world and personal information and privacy & terms agreed with the space of the virtual world of the agent.

According to another aspect, the agent may move between spaces of a virtual world using a gate formed between the spaces of the virtual world. Determining the location of the agent may include determining the location of the agent based on information on a location of the gate when the agent invokes a space of a new virtual world using the gate.

According to yet another aspect, determining the location of the agent may include loading the agent onto a location preferred by a user of the agent in a map for the space of the virtual world of the agent.

According to yet another aspect, the method of constructing a virtual space may further include rendering, by the at least one processor, at least some area of the space of the virtual world based on at least one of a speed, direction and view angle of the agent at the location of the agent.

According to yet another aspect, the method of constructing a virtual space may further include generating, by the at least one processor, a map for the space of the virtual world at timing of the agent.

According to yet another aspect, the method of constructing a virtual space may further include checking, by the at least one processor, whether an interaction feature of the agent at current timing is used.

According to yet another aspect, selecting the digital object may include selecting an object area capable of being displayed to the agent based on a location of the object area obtained based on the world information and the location of the agent, and checking a digital object located in the selected object area.

According to yet another aspect, determining whether to display the content may include determining whether to activate the exposure of the content to the display area of the digital object based on a contract between the owner of the content and the digital object.

According to yet another aspect, the digital object may include at least one of a display object exposed in a spatial form of the space of the virtual world, an interactive object exposed in a spatial form in the space of the virtual world and capable of an interaction with the agent, a web object of a form in which content in a web is exposed through the space of the virtual world, or a streaming object of a form in which streaming content is continuously exposed.

There is provided a non-transitory processor-readable medium having instructions stored thereon, which when executed by one or more processors, cause the one or more processors to implement the method.

There is provided a computer device including at least one processor implemented to execute an instruction readable by a computer. The at least one processor is configured to obtain world information for generating a space of a virtual world, determine a location of an agent in the space of the virtual world, select a digital object capable of being displayed to the agent in the space of the virtual world based on the world information and the location of the agent, determine whether a display area of the selected digital object is present, and determine whether to display content through the display area based on a contract preset with respect to the display area.

DETAILED DESCRIPTION

Hereinafter, embodiments are described with reference to the accompanying drawings.

Figure 1:
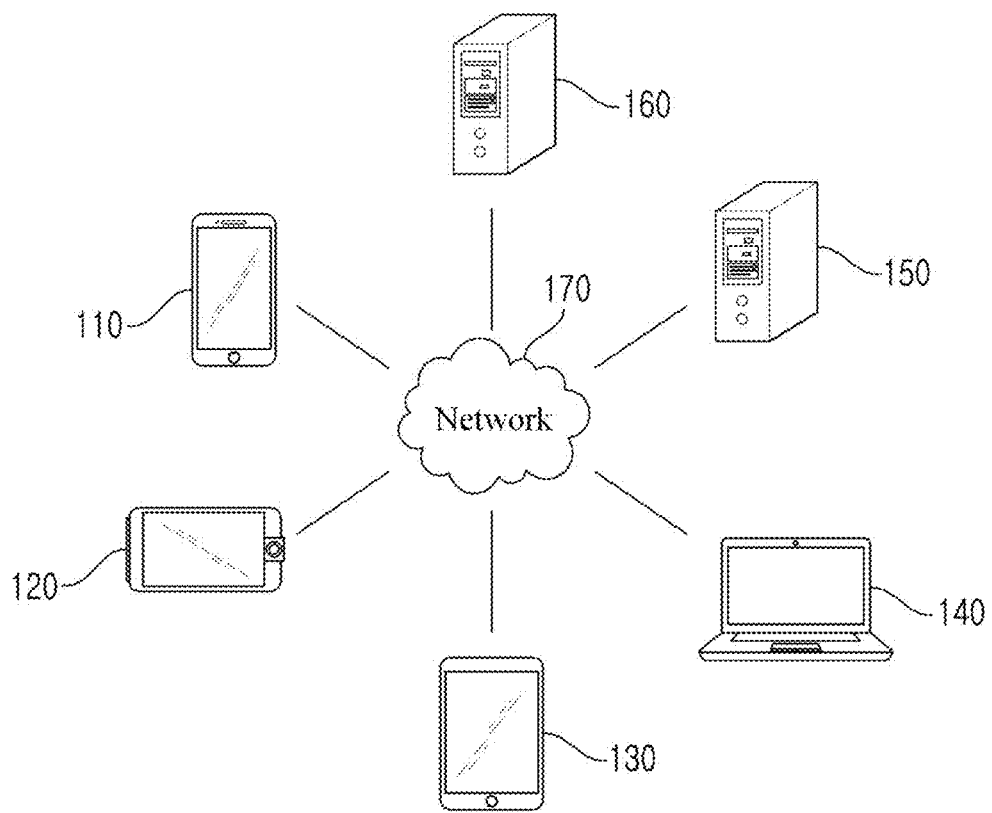
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160 and a network 170. FIG. 1 is an example for the description of the disclosure, and the number of electronic devices or the number of servers is not limited to that in FIG. 1. Furthermore, in FIG. 1, the network environment describes only one example of environments which may be applied to the present embodiments, and an environment which may be applied to the present embodiments is not limited to the network environment of FIG. 1.

The plurality of electronic devices 110, 120, 130, and 140 may be stationary terminals or mobile terminals implemented using computer devices. The plurality of electronic devices 110, 120, 130, and 140 may be a smart phone, a mobile phone, a navigation device, a laptop computer, a terminal for digital broadcasting, personal digital assistants (PDA), a portable multimedia player (PMP) or a tablet PC, for example. For example, in FIG. 1, the electronic device 110 has been illustrated as having a shape of a smart phone. In embodiments of the present disclosure, however, the electronic device 110 may mean one of various physical computer devices capable of substantially communicating with other electronic devices 120, 130, and 140 and/or the server 150 and 160 over the network 170 using a wireless or wired communication method.

A communication method is not limited thereto, and may include short-distance radio communication between devices in addition to a communication method using a communication network (e.g., mobile communication network, the Internet, radio Internet, or broadcast network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as one or a plurality of computer devices that provides an instruction, a code, a file, content or a service through communication with the plurality of electronic devices 110, 120, 130, and 140 over the network 170. For example, the server 150 may be a system that provides a service (e.g., a service based on a virtual space, an instant messaging service, a game service, a group call service (or voice conference service), a messaging service, a mailing service, a social network service, a map service, a translation service, a financial service, a payment service, a search service, or a content provision service) to the plurality of electronic devices 110, 120, 130, and 140 accessed thereto over the network 170.

Figure 2:
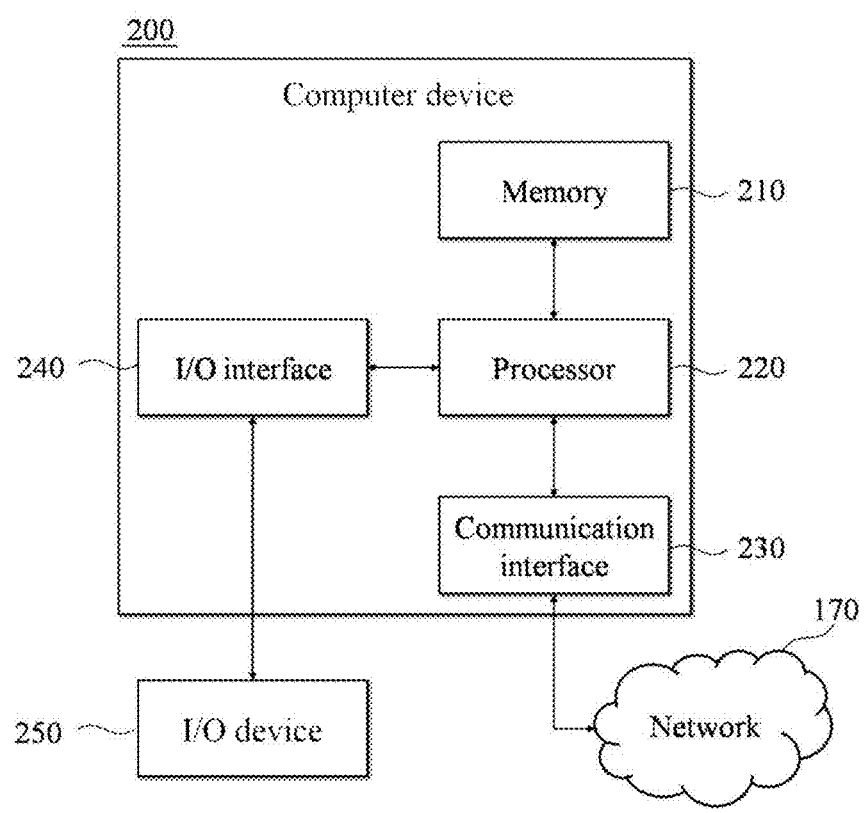
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130, and 140 or each of the servers 150 and 160 may be implemented by a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include a permanent mass storage device, such as a random access memory (RAM), a read only memory (ROM) and a disk drive. In this case, the permanent mass storage device, such as a ROM and a disk drive, may be included in the computer device 200 as a separate permanent storage device different from the memory 210. Furthermore, an operating system and at least one program code may be stored in the memory 210. Such software elements may be loaded from a computer-readable recording medium different from the memory 210 to the memory 210.

Such a separate computer-readable recording medium may include computer-readable recording media, such as a floppy drive, a disk, a tape, a DVD/CD-ROM drive, and a memory card. In another embodiment, the software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process an instruction of a computer program by performing basic arithmetic, logic and I/O operations. The instruction may be provided to the processor 220 by the memory 210 or the communication interface 230. For example, the processor 220 may be configured to execute an instruction received according to a program code stored in a recording device, such as the memory 210.

The communication interface 230 may provide a function for enabling the computer device 200 to communicate with another device over the network 170. For example, a request, an instruction, data or a file generated by the processor 220 of the computer device 200 according to a program code stored in a recording device, such as the memory 210, may be forwarded to other devices over the network 170 under the control of the communication interface 230. Inversely, a signal, an instruction, data or a file from another device may be received by the computer device 200 through the communication interface 230 of the computer device 200 over the network 170. In this case, the signal, instruction or data received through the communication interface 230 may be forwarded to the processor 220 or the memory 210. The file received through the communication interface 230 may be stored in a storage medium (the aforementioned permanent storage device) which may be further included in the computer device 200.

The I/O interface 240 may be means for an interface with an input/output (I/O) device 250. For example, the input device may include a device, such as a microphone, a keyboard or a mouse. The output device may include a device, such as a display or a speaker. For another example, the I/O interface 240 may be means for an interface with a device in which functions for an input and output have been integrated into one, such as a touch screen. At least one of the I/O devices 250 may be configured as one device along with the computer device 200. For example, at least one of the I/O devices 250 may be implemented in a form in which a touch screen, a microphone, and a speaker have been included in the computer device 200, like a smart phone.

Furthermore, in other embodiments, the computer device 200 may include elements more or less than those of FIG. 2. However, most of the elements of a conventional technology do not need to be clearly illustrated. For example, the computer device 200 may be implemented to include at least some of the I/O devices 250 or may further include other elements, such as a transceiver and a database.

Figure 3:
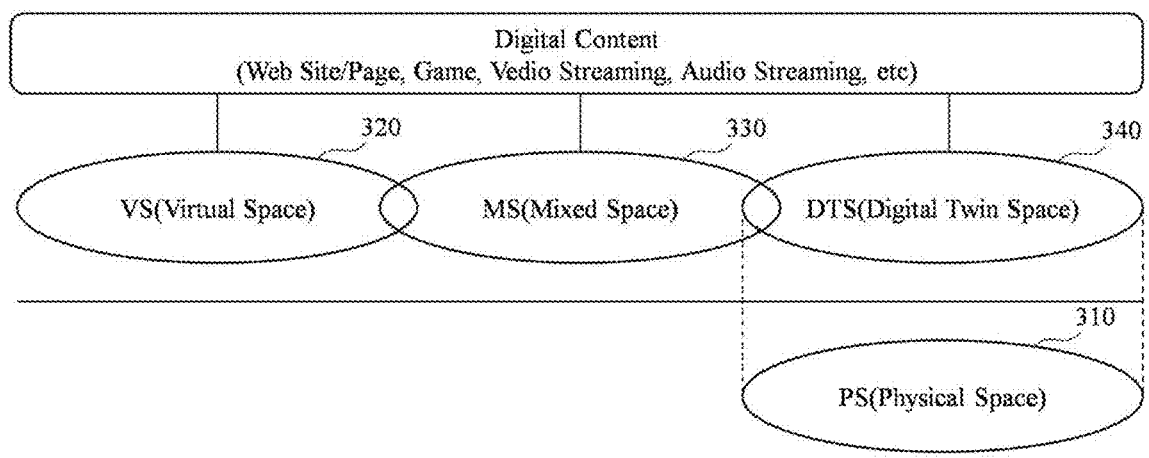
FIG. 3 is a diagram for describing spaces according to an embodiment of the present disclosure.

FIG. 3 is a diagram for describing spaces according to an embodiment of the present disclosure. FIG. 3 illustrates a physical space (PS) 310, that is, a spade of the real world, and a virtual space (VS) 320, a mixed space (MS) 330 and a digital twin space (DTS) 340, that is, spaces of a virtual world.

A space of a virtual world may be designed by the supplier (or service provider) of the virtual world or may be constructed by a user or a third party service provider, that is, an external service provider. A space of a virtual world may be configured in a form, such as the VS 320, the MS 330 and/or the DTS 340, based on the features of the space. The VS 320 may be a purely digital-based space capable of interoperating with a cyber physical system (CPS). The DTS 340 is a virtual space based on the real world, and may be a space interoperated with the CPS. The MS 330 may be a space in which the VS 310 and the DTS 340 are mixed. The MS 330 may be provided in a form in which an agent, that is, an object of a user, is adapted to an environment of the real world or may be provided in a form in which an environment of the real world is rendered on a virtual world.

A space of a virtual world is a concept of a basic virtual space in which the agent of a user can do activities. A policy for the activities and information utilization and/or exposure of an agent may be present in each space of a virtual world. If the agent of a user uses a service in a space of a specific virtual world, the user needs to be able to recognize that each piece of personal information and privacy & terms are present depending on the subject of service provision.

A space of a virtual world may be variously generated and used depending on a supplier or a user. To this end, a separate gate may be provided as an interface for a movement of an agent between spaces of a virtual world.

Figure 4:
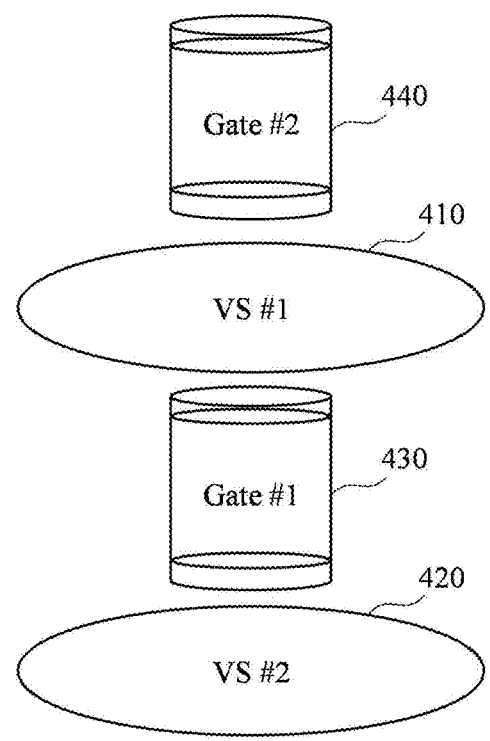
FIG. 4 is a diagram illustrating an example of a movement between spaces of a virtual world in an embodiment of the present disclosure.

FIG. 4 is a diagram illustrating an example of a movement between spaces of a virtual world in an embodiment of the present disclosure. FIG. 4 illustrates a gate #1 430 for a movement between two virtual spaces, that is, a VS #1 410 and a VS #2 420. In this case, the "gate" may be a basic interface that provides a movement between spaces of a virtual world. Such a gate may control even a movement between a space of a virtual world and a space of a non-virtual world in addition to a movement between spaces of a virtual world. For example, FIG. 4 illustrates that the agent of the VS #1 410 can move to a movement target in a space of a non-virtual world, such as a web page, a streaming channel, streaming content, a game environment, or an actual offline video call. A method of identifying spaces of a virtual world may be determined by the supplier of a space of a corresponding virtual world.

An agent may mean a user or program in a space of a virtual world. In this case, an agent as a program has a form of an artificial intelligence agent, and may be a virtual avatar or persona that is present instead of a third party service provider. The physical features of a space of a virtual world to which an agent belongs may be applied to the agent. A service profile configured in a space of a virtual world may be applied to an agent. Furthermore, an agent may have features based on information of a physical device used by a user. For example, an agent may have a view angle according to a display feature of a physical device used by a user or may have a control feature according to the controller of a corresponding physical device.

Furthermore, a digital object to be described subsequently is a core element that configures world information in a space of a virtual world, and may collectively refer to objects that provide a mutual interaction function with an agent.

Figure 5:
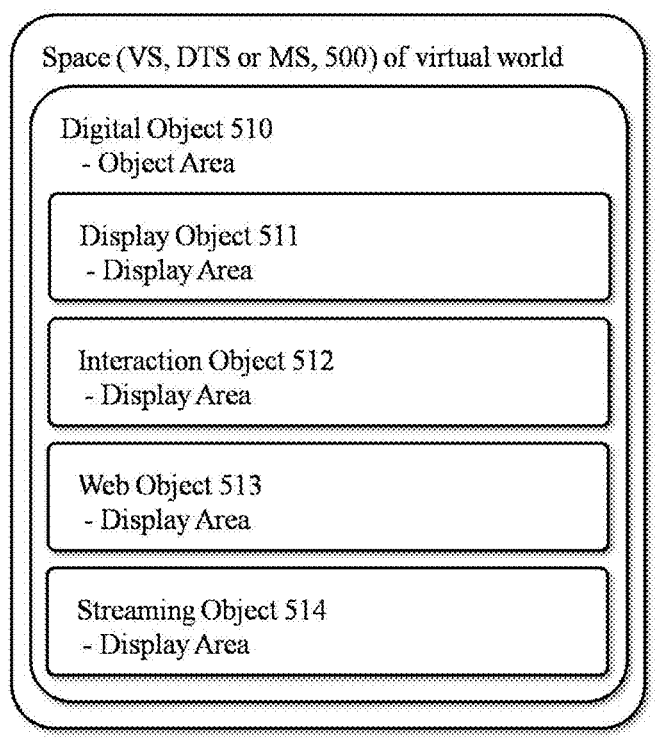
FIG. 5 is a diagram illustrating the relation between elements configuring a space of a virtual world according to an embodiment of the present disclosure.
Figure 6:
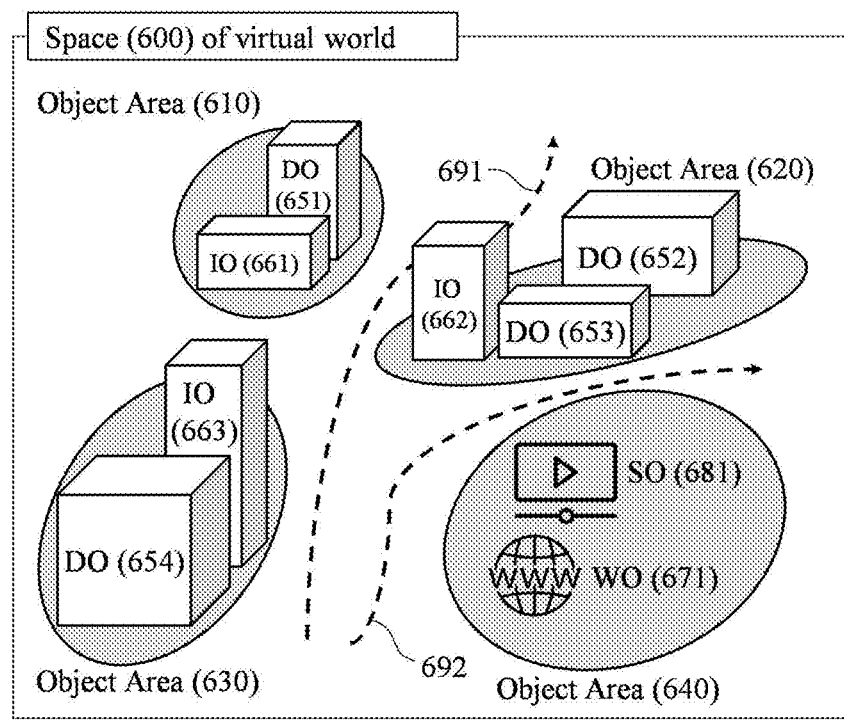
FIG. 6 is a diagram illustrating an example in which a digital object has been configured in a space of a virtual world according to an embodiment of the present disclosure.

FIG. 5 is a diagram illustrating the relation between elements configuring the space of a virtual world according to an embodiment of the present disclosure. FIG. 6 is a diagram illustrating an example in which a digital object has been configured in the space of a virtual world according to an embodiment of the present disclosure.

FIG. 5 illustrates that a space 500 of a virtual world, such as the VS 320, the MS 330 and/or the DTS 340 illustrated in FIG. 3, may include a digital object 510. The digital object 510 may be formed in an object area (OA), that is, an area included in the space 500 of the virtual world. Furthermore, the digital object 510 may include a display object (DO) 511, an interaction object (10) 512, a web object (WO) 513 and a streaming object (SO) 514. Each of the display object 511, the interaction object 512, the web object 513 and the streaming object 514 may optionally include a display area for the display of content.

FIG. 6 illustrates an example in which digital objects have been deployed in object areas 610 to 640 formed in a space 600 of a virtual world. The digital objects may include DOs 651 to 654 that are display objects, IOs 661 to 663 that are interaction objects, a WO 671 that is a web object and/or an SO 681 that is a streaming object. In FIG. 6, dotted-line arrows 691 and 692 illustrate an example of a flow along which an agent can move.

As in the example of FIG. 6, various forms of digital objects may be present in a space of a virtual world according to an embodiment of the present disclosure. Each of the digital objects may be generated on the basis of an agent under a predetermined condition. In this case, the digital object may be generated in an object area. If a space of a virtual world has simulated the real world like the DTS (e.g., the DTS 330 in FIG. 3), the location of an object area may be determined based on the physical location of a determined real world. For example, if a specific shopping mall or historic site in the real world is virtualized, the location of an object area may be determined to have the same configuration as an actual location configuration.

The display object (DO) may be an object exposed to a space of a virtual world in a spatial form (structural form), and may provide a simple control function to an agent. The interactive object (IO) may be exposed to a space of a virtual world in a spatial form, and may be an object having an interactive feature capable of an interaction with an agent. For example, the IO may provide various interaction features with an agent. Furthermore, the web object (WO) may be an object of a form which content in a web is exposed through a space of a virtual world. Furthermore, the streaming object (SO) may be an object of a form in which streaming content, such as video or audio, can be continuously exposed.

An object area (OA) may have the features of a space capable of generating a digital object, that is, a virtual object, in a space of a virtual world. A digital object present in an OA may basically have the following functions. Whether to provide each of the functions may be determined based on a contract between the owner of a digital object and the supplier of a space of a virtual world.

1. Function related to agent interoperation
  1) Interaction function: function providing an interface that enables an agent's direct control
  2) History function: function capable of tracking and storing information related to the visit and interaction of an agent
  3) Interested information storage (Favorite/Like) function: function for enabling an agent to store interested information for a digital object
  4) Follow me function: function for making a digital object in an OA a small window or an icon so that the small window or icon follows near an agent 2. Function related to external API interoperation
  1) Function capable of sharing information on timing at which a digital object is generated and terminated in a space of a virtual world
  2) Interface function for providing, to the outside, information related to an agent and collected by digital objects in an OA
  3) Interface function for representing information on a DO or IO by incorporating real world information into the information (e.g., function for representing information, such as order waiting in an actual store, congestion within a shop, or a parking condition)
 3. Function related to gate interoperation
  A gate connection function: function for connecting an agent to
  another VS or PS in a digital object present in an OA
 4. Function related to display area
  1) DA function: an area in which the owner of a digital object may expose content based on its intention, and may be exposed to an agent.
  2) Display content request function: function capable of being supplied with external content through a real-time content control module The display object (DO) and the interaction object (TO) are part of elements configuring a space of a virtual world and may be present in an object area (OA). The DO and the IO appear in a form basically displayed on a screen of a user, and may have the features of a structure having given specifications. External information of the DO may be provided to the supplier side of a space of a virtual world by the owner of the DO or may be directly designed using a template provided by the supplier side or using a preset tool. Furthermore, each of the DO and IO may have a display area (DA) which may be directly controlled by an owner. Content exposed in a DA may be provided based on the selection of the owner of the DO and/or the IO within a proper range based on a policy between the owner of the DO and/or the IO and the supplier of a space. A DA may individually have an exposure feature (e.g., perspective or a feature for effectiveness regardless of perspective) and an interaction feature based on a view angle of an agent. Furthermore, each IO may have an interactive feature which may be directly controlled by the owner of the IO. The IO may provide an interaction suitable for a condition of an agent based on interaction feature activation information of the agent. For example, when a user wears only a head mounted display (HMD), the IO may provide a behavior function having the same form as that of the DO. In contrast, when a user has a controller combined with an HDM, the IO may provide an interaction feature (e.g., grabbing, pulling or drawing) with an agent, which is provided in a space of a corresponding virtual world. For another example, when a user has an additional motion recognition controller, the IO may use a corresponding feature. The DO may have a basic control feature. Such a basic control feature may include the basic control function for a space of a virtual world constructed by the supplier side. For example, the basic control function may include a history configuration and/or an interested information configuration.

Figure 7:
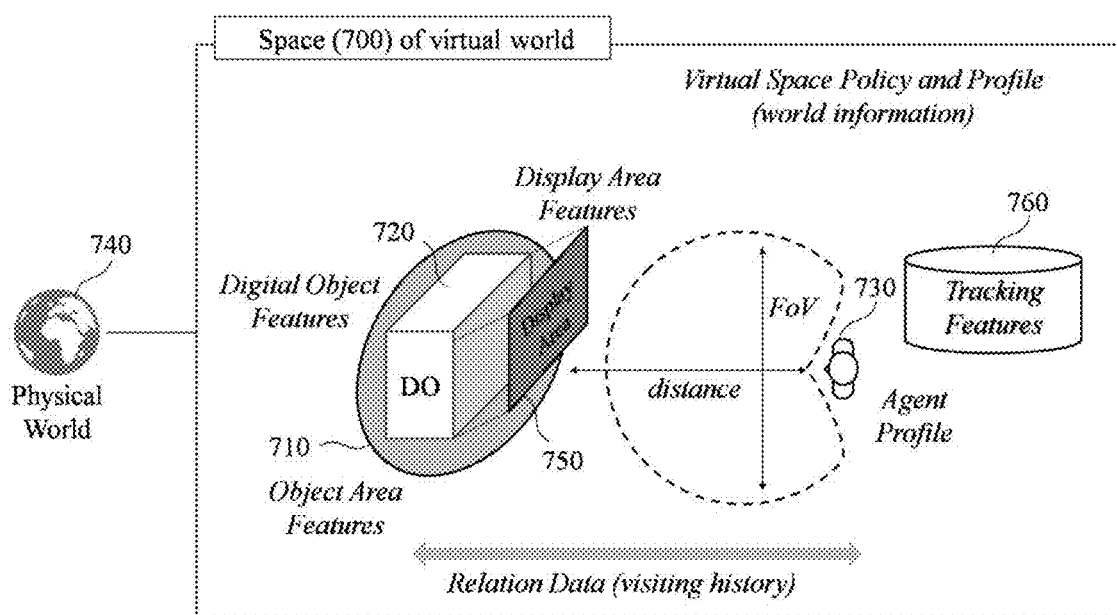
FIG. 7 is a diagram illustrating an example of information for determining whether to expose digital objects to an agent in a space of a virtual world in an embodiment of the present disclosure.

FIG. 7 is a diagram illustrating an example of information for determining whether to expose digital objects to an agent in a space of a virtual world in an embodiment of the present disclosure. FIG. 7 illustrates the state in which an object area 710, a digital object 720 and an agent 730 have been deployed in a space 700 of a virtual world. The space 700 of the virtual world may interoperate with a physical world (or real world) 740. In this case, the features (Digital Object Features) of the digital object 720 may include the features (Object Area Features) of the object area 710. The features of the object area 710 may include basic information for a specific area within the space 700 of the virtual world. For example, multiple sub-digital objects may be present within the space 700 of the virtual world. Each of the multiple sub-digital objects may follow the existing policy of a corresponding object area. Furthermore, as described above, the digital object 720 may be any one of a DO, an IO, a WO and an SO. Accordingly, the features of the digital object 720 may include any one of the feature of the DO, the feature of the IO, the feature of the WO and the feature of the SO. Furthermore, the features of the digital object 720 may further include the features (Display Area Features) of the display area 750 included in the digital object 720 and tracking features 760 for the agent 730.

In this case, in order to determine whether to expose the digital object 720 to the agent 730 in the space 700 of the virtual world, (1) the features of the digital object 720, (2) the field of view (FoV) of the agent 730 and (3) the distance between the agent 730 and the display area 750 may be used.

Figure 8:
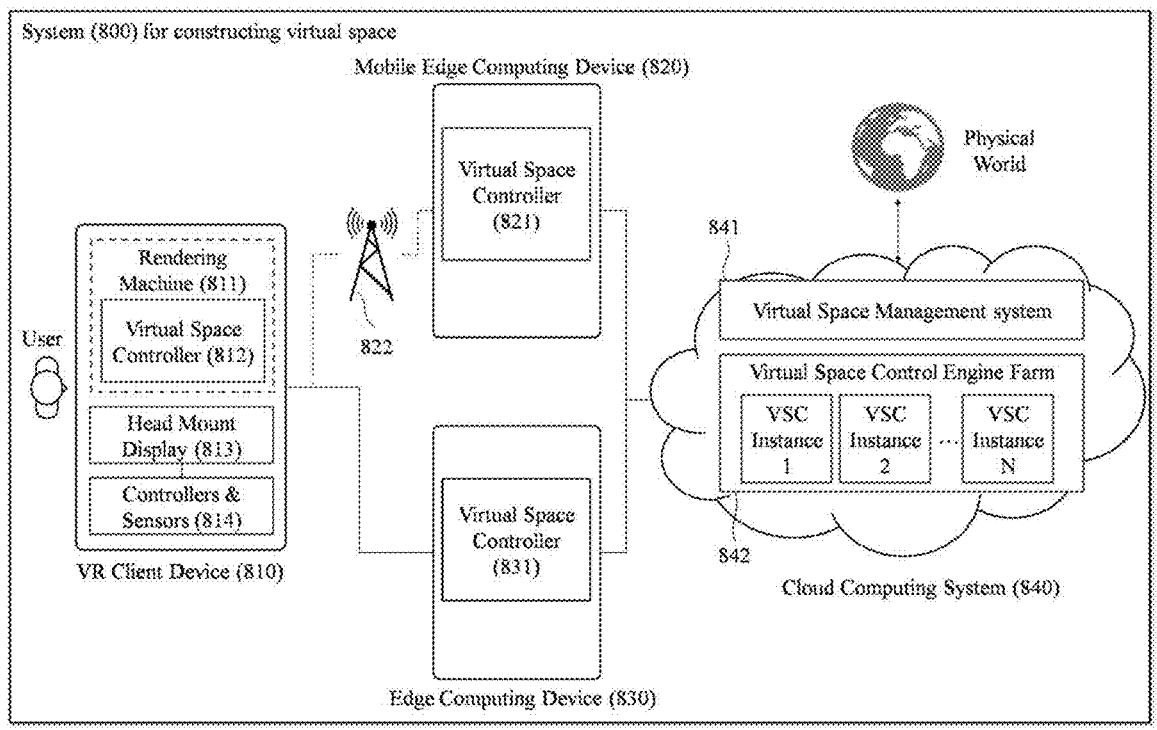
FIG. 8 is a diagram illustrating an overview of a system for constructing a virtual space according to an embodiment of the present disclosure.

FIG. 8 is a diagram illustrating an overview of a system for constructing a virtual space according to an embodiment of the present disclosure. In FIG. 8, the system 800 for constructing a virtual space may include a virtual reality (VR) client device 810, a mobile edge computing device 820, an edge computing device 830 and a cloud computing system 840. Each of the VR client device 810, the mobile edge computing device 820, the edge computing device 830 and the cloud computing system 840 may be implemented using the computer device 200 described with reference to FIG. 2. It may be easily understood that the cloud computing system 840 may be implemented by two or more computer devices 200.

The VR client device 810 may be a physical device for displaying a space of a virtual world to a user. As illustrated in FIG. 8, the VR client device 810 may include a rendering machine 811, the virtual space controller (hereinafter referred to as "VSC") 812 which may be included in the rendering machine 811, a head mount display (hereinafter referred to as "HMD") 813 and controllers & sensors 814. The rendering machine 811 may display a space of a virtual world on the HMD 813 through the VSC 812. An output value of the controllers & sensors 814 may be used to control the agent of a user in a space of a virtual world and/or to interact with digital objects deployed in a space of a virtual world.

In some embodiments, the VSC 812 may be included in the mobile edge computing device 820 or the edge computing device 830 without the VR client device 810 or the rendering machine 811. For example, if the VR client device 810 of a user is a device capable of directly rendering a space of a virtual world, the space of the virtual world may be rendered using the VSC 812 of the VR client device 810. In contrast, if the VR client device 810 of a user cannot directly render a space of a virtual world, the VR client device 810 may display the space of the virtual world on the HMD 813 by rendering the space of the virtual world through the VSC 821 of the mobile edge computing device 820 that is wirelessly connected to the VR client device through an access point 822 or the VSC 831 of the edge computing device 830 that is connected to the VR client device over wires. If both the mobile edge computing device 820 and the edge computing device 830 are not supported, as will be described later, a space of a virtual world may be rendered using a virtual space controller farm 842 included in the cloud computing system 840. The virtual space controller farm 842 may support a user to display a rendered space of a virtual world on the HMD 813 by generating an instance of a VSC for the user. In this case, the VSCs 812, 821 and 831 may be VSC instances that are provided by the cloud computing system 840 through the virtual space controller farm 842.

The VR client device 810 may be directly connected to the cloud computing system 840 or connected to the cloud computing system 840 through the mobile edge computing device 820 or the edge computing device 830, and may be provided with services related to a space of a virtual world.

The cloud computing system 840 may be a system of a service provider for constructing a space of a virtual world and providing a user with services related to the space of the virtual world. As illustrated in FIG. 8, the cloud computing system 840 may include a virtual space management system 841 and the virtual space controller farm 842. The virtual space controller farm 842 may be implemented in a form included in the virtual space management system 841. The virtual space management system 841 is described more specifically later with reference to FIG. 9.

Figure 9:
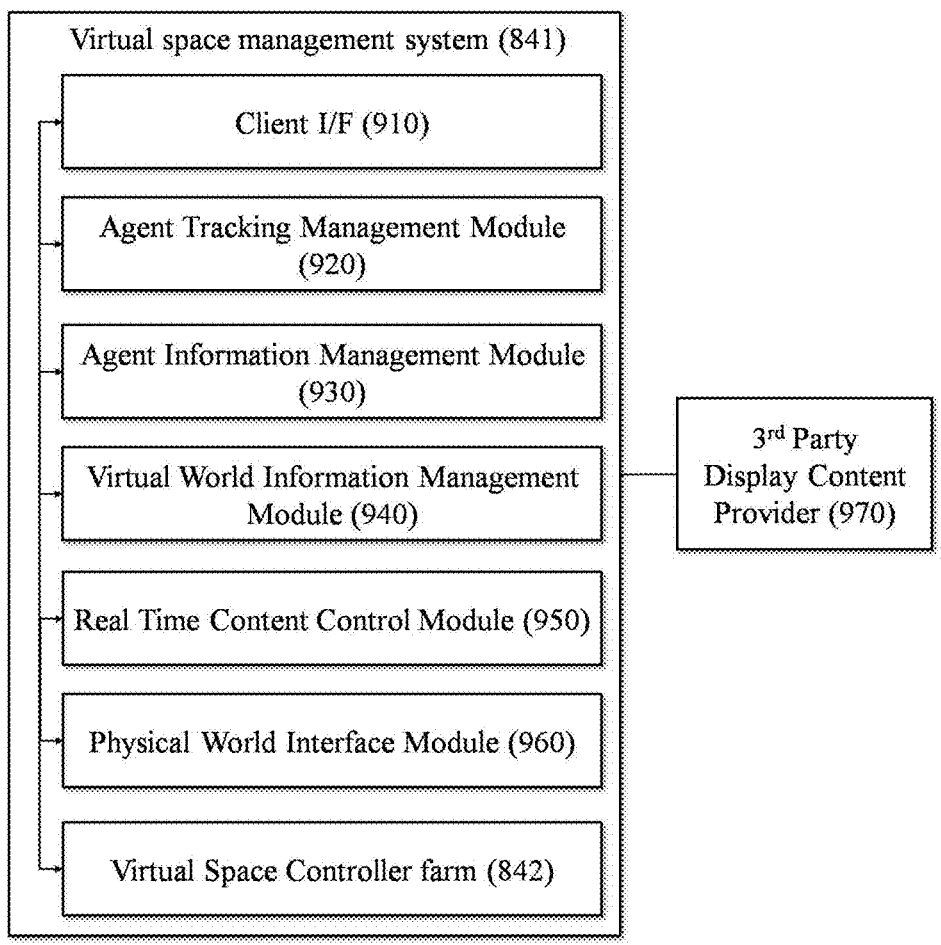
FIG. 9 is a block diagram illustrating an example of an internal configuration of a virtual space management system 841 according to an embodiment of the present disclosure.

FIG. 9 is a block diagram illustrating an example of an internal configuration of the virtual space management system 841 according to an embodiment of the present disclosure. As illustrated in FIG. 9, the virtual space management system 841 according to the present embodiment may include a client interface (I/F) 910, an agent tracking management module 920, an agent information management module 930, a virtual world information management module 940, a real-time content control module 950, a physical world interface module 960 and a virtual space controller farm 842. The elements of the virtual space management system 841 may be functional expressions of the processor 220 included in at least one computer device 200 that implements the cloud computing system 840.

The client I/F 910 may provide a user I/F for the VR client device 810. For example, the client I/F 910 may provide a user with various user I/Fs through which the user can interact with a space of a virtual world in a process for the user to be provided with a service for the space of the virtual world provided by the cloud computing system 840 using the VR client device 810.

The agent tracking management module 920 may track an agent that is positioned and moves in a space of a virtual world. Information obtained by tracking the agent may be stored in a tracking database (DB) in real time in association with the identifier of the agent. Tracking history information for the agent may be stored in a tracking history DB in association with the identifier of the agent.

The agent information management module 930 may store the profile of an agent and the consent of the agent. For example, the agent information management module 930 may store the profile of an agent in an agent profile DB in association with the identifier of the agent, and may store the contents of the consent of the agent in an agent consent DB in association with the identifier of the agent. In this case, the consent may include consent to personal information and privacy & terms.

The virtual world information management module 940 may manage information on a space of a virtual world. For example, the virtual world information management module 940 may store information on the policy for a space of a virtual world, virtual map information, location information for a space of a virtual world (e.g., GPS information for a space of a virtual world), or information on digital objects deployed in a space of a virtual world, and may provide corresponding information in response to a request from another module.

The real-time content control module 950 may select content to be displayed in a space of a virtual world. For example, the real-time content control module 950 may select content to be displayed through the display area of a digital object configured within a virtual world space. To this end, the real-time content control module 950 may include a function for content bidding and a function for selecting content to be displayed. For example, the real-time content control module 950 may select content to be displayed through a display area based on bidding for a third party display content provider 970.

The physical world interface module 960 may provide a function for controlling physical resources and an interface for physical resources.

The virtual space controller farm 842, as described above, may generate, provide and manage an instance of a VSC in order to help the rendering of the VR client device 810.

The virtual space management system 841 may receive HMD information and control/sensor information from the VR client device 810. The HMD information may include device motion tracking information of a 3-degrees of freedom (DoF) or a 6-DoF. In this case, the device motion tracking information may include motion tracking information for the VR client device 810. Furthermore, the HMD information may include user information from the VR client device 810. For example, the user information may include the rotation of the head of a user, a movement of the body of a user, or eye-gaze information of a user. Furthermore, the HMD information may include rendering-related information, such as rendering delay or a temperature. The control/sensor information may include information on a movement of the body of a user, a key event, or real-time controller information such as a movement.

Figure 10:
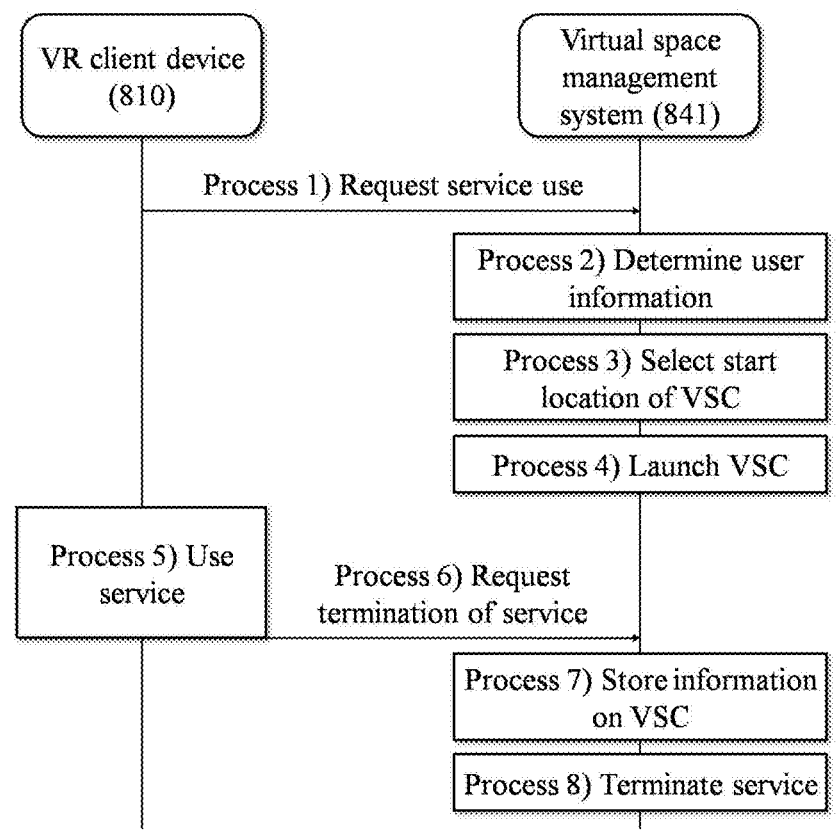
FIG. 10 is a flowchart illustrating an example of a process of supporting a VSC in the virtual space management system based on a service use of a user in an embodiment of the present disclosure.

FIG. 10 is a flowchart illustrating an example of a process of supporting a VSC in the virtual space management system based on a service use of a user in an embodiment of the present disclosure.

A process 1) may be an example of a process for the VR client device 810 to request a service use from the virtual space management system 841. A user may substantially request a connection for accessing a desired service from the cloud computing system 840 using the VR client device 810, that is, his or her VR device. In this case, the connection request may be performed on the virtual space management system 841 closest to the user based on a service network configuration.

A process 2) may be an example of a process for the virtual space management system 841 to determine user information. In this case, the virtual space management system 841 may review whether to provide the service to a corresponding user after receiving the request from the user. For example, the virtual space management system 841 may load information related to a virtual environment configuration based on a device (e.g., the VR client device 810) currently accessed by a user, a network environment and a previously recorded service profile. In order to effectively provide the service, the virtual space management system 841 may continuously monitor delay speed or available conditions for a user edge environment (e.g., the mobile edge computing device 820 and/or the edge computing device 830) in which a VSC may operate.

A process 3) may be an example of a process for the virtual space management system 841 to select the start location of the VSC for the user. For example, the virtual space management system 841 may select a VSC operation environment for providing a service to a corresponding user. In this case, if the user directly has a device of a level capable of rendering, the VSC may operate in the VR client device 810, that is, the device of the user. If rendering can be directly processed in the VR client device 810, that is, the device of the user, the VSC may operate in the mobile edge computing device 820 and/or the edge computing device 830. For example, if a radio network connection is given priority, the mobile edge computing device 820 may be used. If a wired network connection is given priority, the edge computing device 830 may be used. If rendering is impossible even in an edge environment, the rendering of a user may be supported by generating and providing a VSC instance through the virtual space controller farm 842.

A process 4) may be an example of a process for the virtual space management system 841 to launch the VSC. For example, a VSC service may be launched from an environment selected by the virtual space management system 841. In this case, the environment selected by the virtual space management system 841 may be an environment in the VR client device 810, an environment in the mobile edge computing device 820, an environment in the edge computing device 830, or an environment in the cloud computing system 840.

A process 5) may be an example of a process for the user to use the service through the VR client device 810. For example, the VR client device 810 may process rendering for a space of a virtual world based on the launched VSC, and may provide the service to the user by displaying the rendered space of the virtual world in the HMD of the VR client device 810.

A process 6) may be an example of a process for the VR client device 810 to request the termination of the service use from the virtual space management system 841. For example, when the agent of a user moves to another space of a virtual world or terminates a service, the VR client device 810 may request the termination of the service use from the virtual space management system 841.

A process 7) may be an example of a process for the virtual space management system 841 to store information on the VSC. For example, the VSC may forward target logging information of agent-related information to the virtual space management system 841. The virtual space management system 841 may store the received information.

A process 8) may be an example of a process for the virtual space management system 841 to terminate the service. For example, after an agent is logged out, the virtual space management system 841 may restore resources for a VSC operation environment in order to terminate a service for a user. Furthermore, the virtual space management system 841 may generate billing information on a related cost, if necessary, may generate user notification for such process information, and may provide the user notification.

Figure 11:
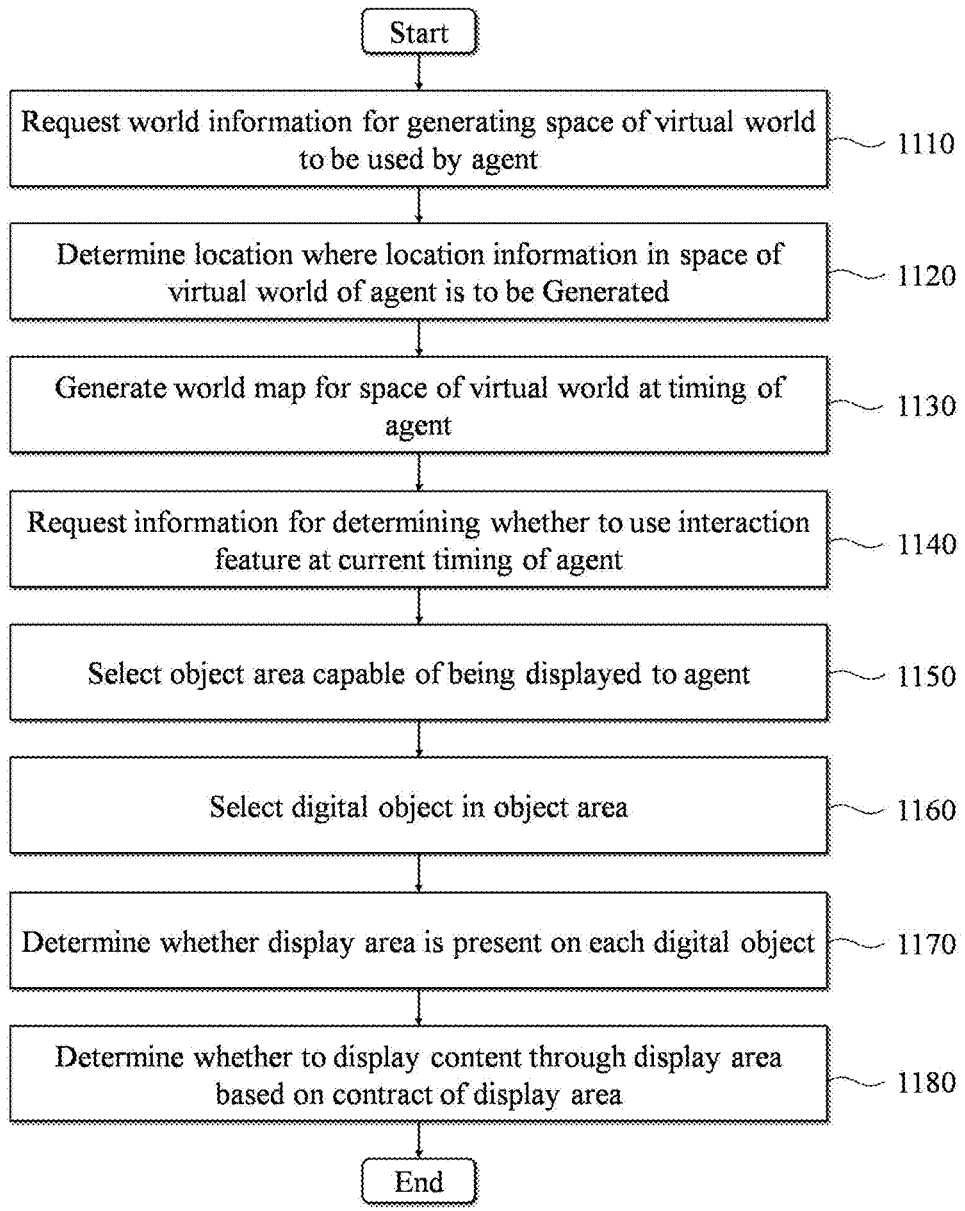
FIG. 11 is a flowchart illustrating an example of a process for constructing a space of a virtual world for an agent in an embodiment of the present disclosure.

FIG. 11 is a flowchart illustrating an example of a process for constructing a space of a virtual world for an agent in an embodiment of the present disclosure. A method of constructing a virtual space according to the present embodiment may be performed by the computer device 200 that implements a VSC launched for the VR client device 810. For example, when a VSC is launched on the VR client device 810, a method of constructing a virtual space may be performed by the computer device 200 that implements the VR client device 810. For another example, when a VSC is launched on the mobile edge computing device 820 or the edge computing device 830, a method of constructing a virtual space may be performed by the computer device 200 that implements the mobile edge computing device 820 or the edge computing device 830. For yet another example, when a VSC is launched on the cloud computing system 840, a method of constructing a virtual space may be performed by the computer device 200 that implements the cloud computing system 840.

In this case, the processor 220 of the computer device 200 may be implemented to execute a control instruction based on a code of an operating system or a code of at least one computer program stored in the memory 210. In this case, the processor 220 may control the computer device 200 to perform steps 1110 to 1180 included in the method of FIG. 11 based on a control instruction provided by a code stored in the computer device 200.

At step 1110, the computer device 200 may request world information for generating a space of a virtual world to be used by an agent. For example, a VSC launched on the computer device 200 may request, from the virtual world information management module 940 included in the virtual space management system 841, world information for generating a virtual world to be used by an agent. In this case, the world information may include a map for a space of the virtual world, information on an object area, information on a digital object in which a corresponding object area is located (e.g., information on the deployment of an DO, an IO, a WO and an SOs), policy information for a space of the virtual world, and personal information and privacy & terms agreed with a space of the virtual world of the agent.

At step 1120, the computer device 200 may determine a location where location information in the space of the virtual world of the agent will be generated. For example, when the agent requests space of a new virtual world using a gate, the computer device 200 may use information on the location of the corresponding gate. For another example, if an agent is loaded onto a given location, the computer device 200 may select a location area where a user is present in a map for a space of a virtual world based on history information for the space of the virtual world of the user, and may load the agent onto the selected location area. Furthermore, the computer device 200 may determine whether the agent moves based on the speed and direction of the agent, and may determine a view angle based on the profile of a terminal (e.g., the VR client device 810) of the agent. Furthermore, the computer device 200 may use the determined view angle to determine an area for rendering in the space of the virtual world. In other words, the computer device 200 may render at least some area of the space of the virtual world based on at least one of the speed, direction and view angle of the agent at the location of the agent. The computer device 200 may collect user interaction-possible information for the rendered area.

At step 1130, the computer device 200 may generate a world map for the space of the virtual world at timing of the agent. The world map may correspond to the aforementioned map. The computer device 200 may generate the world map for the space of the virtual world at timing of the agent after loading information on the world information based on the location information. In this case, if the entire world information is massive, the computer device 200 may generate the world map based on the location of the agent for an effective space construction.

At step 1140, the computer device 200 may request information for determining whether to use an interaction feature at the current timing of the agent. For example, if a display area is exposed at timing of an agent, a task for selecting an information exposure area combined with corresponding information is necessary. Furthermore, if a user I/O interface is restricted due to the use of a specific interaction feature, the computer device 200 may process such restriction, or may expose information combined with a corresponding interaction object. Accordingly, the computer device 200 may request information for determining whether to use an interaction feature now available for the agent.

At step 1150, the computer device 200 may select an object area which may be displayed to the agent. For example, the computer device 200 may select a target object area which may be displayed to the agent based on the location of an object area obtained based on the location of the agent and the world information and information previously used by the agent.

At step 1160, the computer device 200 may select a digital object in the object area. For example, the computer device 200 may select at least one of a DO, an TO, a WO or an SO as a digital object to be displayed in the object area selected at step 1150.

At step 1170, the computer device 200 may determine whether a display area is present on each digital object. As described above, each of the DO, the TO, the WO and the SO as the digital object may optionally include a display area for the exposure of content. The computer device 200 may identify whether the digital object selected at step 1160 includes a display area at step 1170.

The computer device 200 may select an object area based on the location of an agent and the interaction of the agent in a world map for a space of a virtual world. Thereafter, the computer device 200 may select a digital object for the selected object area, and may identify whether a display area is present in each digital object. In this case, the subject of selection is basically a VSC (i.e., the computer device 200 on which the VSC has been substantially launched). If an object area or a digital object is used in the form of an application or process, the subject of selection may be an object area or a digital object. Furthermore, if an information configuration method based on federated learning is used, an object area or a digital object may provide individual information. A VSC may finally select the object area and/or the digital object based on the provided information.

At step 1180, the computer device 200 may determine whether to display content through the display area based on the contract of the display area. For example, the computer device 200 may determine whether to activate the exposure of corresponding content in a display area based on the contract between a content owner and a digital object. Whether to activate the exposure of the content may be determined in a fixed exposure type (always exposed) or in a separately customized exposure type based on a configuration of a digital object or a configuration of a display area. Content which may be exposed through a display area may be selected based on the contract between a content owner and a digital object.

Figure 12:
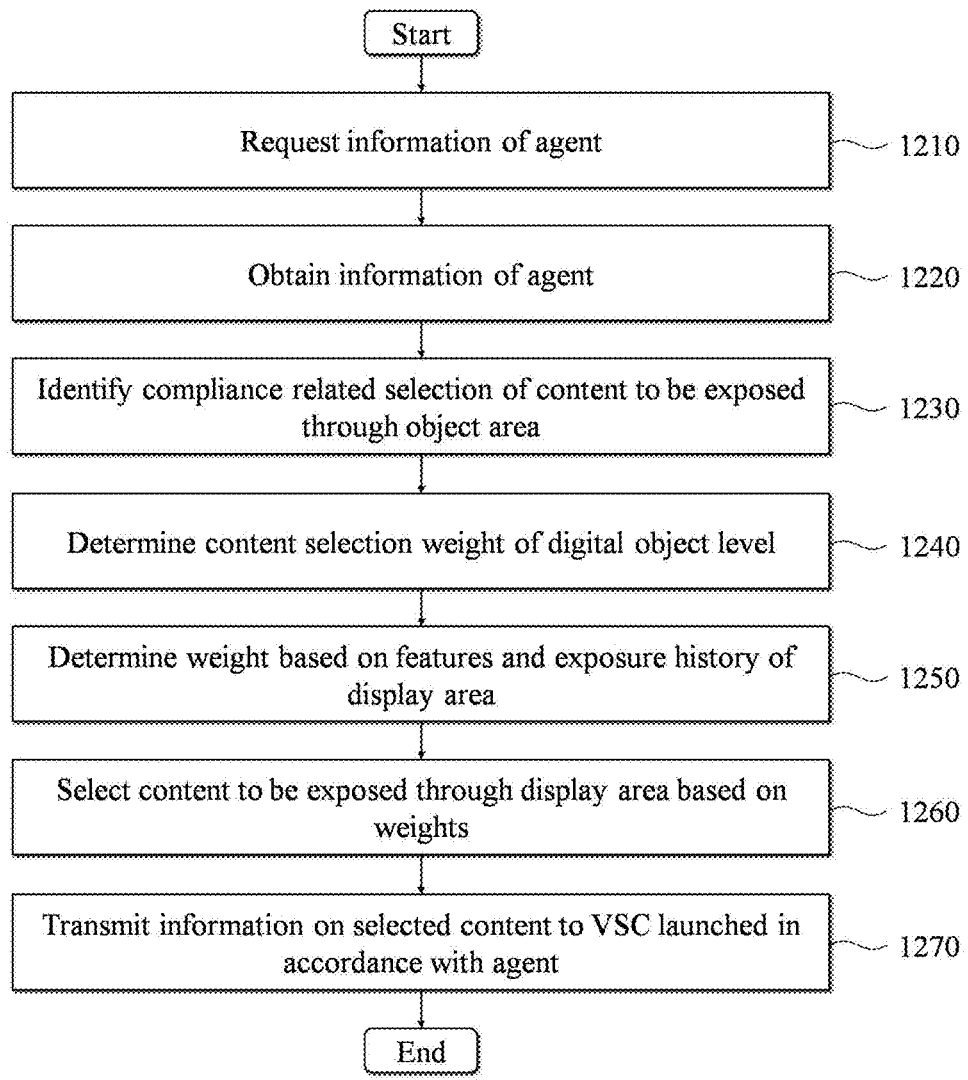
FIG. 12 is a flowchart illustrating an example of a method of selecting content using the tracking features of an agent in an embodiment of the present disclosure.

FIG. 12 is a flowchart illustrating an example of a method of selecting content using the tracking features of an agent in an embodiment of the present disclosure. The method of selecting content according to the present embodiment may be performed by a digital object and an agent. The method of selecting content may be substantially performed based on the exchange of information between the system of a third party service provider corresponding to a digital object and the terminal (e.g., the VR client device 810) of a user corresponding to an agent. In this case, each of the system of the third service provider and the terminal of the user may be implemented by the computer device 200.

At step 1210, a digital object may request information of an agent. More specifically, a digital object may request agent information of an agent related to the digital object positioned in a space of a virtual world. In this case, the agent related to the digital object may be determined based on at least one of the distance between the agent and the digital object, a view angle of the agent, and whether the agent and the digital object interact with each other.

Multiple digital objects may be present in a space of a virtual world. Each of the digital objects performs a role, such as the sign of a shop, building or service company in the real world, and may expose content to an agent. In this case, each digital object may expose finer customized content to the agent using information (tracking features) of the agent. To this end, the digital object may request information from the agent in order to provide proper compensations to the agent. The agent may provide the information to the digital object in order to receive a customized service. The digital object may select suitable content based on the information obtained from the agent, and may expose the selected content through a display area. A method for the exchange of information between the digital object (i.e., actually the terminal of a third party service provider corresponding to the digital object) and the agent (actually the terminal of a user is described more specifically later with reference to FIGS. 13 and 14.

At step 1220, the digital object may obtain the information of the agent. If the digital object cannot use the tracking features of the agent, the digital object may select content in a random manner or may not exposed content. After obtaining the information of the agent, the digital object may connect the obtained information to information owned by the digital object, and may determine content to be exposed.

At step 1230, the digital object may identify compliance related to the selection of content to be exposed through an object area. The digital object may determine the features of content which may be exposed based on policy information of an object area through which the digital object is exposed. For example, the policy information may include content exposure restriction information for each age, political restriction information, or exposable category information based on a location or time.

At step 1240, the digital object may determine a content selection weight of a digital object level. For example, the digital object may assign a weight for generating a content request based on content preference information (e.g., preset policy information) owned by the digital object.

At step 1250, the digital object may determine a weight based on the features and exposure history of the display area. For example, the digital object may calculate a weight based on the features of a display area and an exposure history in which content has been exposed through the display area (e.g., weight information for each piece of content based on interaction feedback of previously exposed content).

At step 1260, the digital object may select content to be exposed through the display area based on the weights. For example, the digital object may transmit determined weights to the real-time content control module 950 included in the virtual space management system 841, and may secure content selected through bidding in the real-time content control module 950.

At step 1270, the digital object may transmit information on the selected content to a VSC launched in accordance with the agent. The VSC may render a space of a virtual world so that content forwarded in relation to the display area of the digital object is displayed in a space of a virtual world for the agent. As described above, the VSC may be generated for the VR client device 810 of a user, corresponding to the agent, by the cloud computing system 840 that constructs a space of a virtual world and provides services. The VSC may be launched on at least one of the VR client device 810, the mobile edge computing device 820, the edge computing device 830 or the cloud computing system 840, and may support the rendering of the space of the virtual world for the VR client device 810.

At the same timing, the same information may be exposed to multiple agents. For example, the digital object may expose the same information to multiple agents at the same timing according to the policy of a space of a corresponding virtual world. For another example, if the digital object interacts with multiple agents, it may expose the same information to multiple agents at the same timing. For yet another example, if agents between which an intimacy score is a preset score or more are located as a group, the digital object may expose the same information to multiple agents at the same timing.

Figure 13:
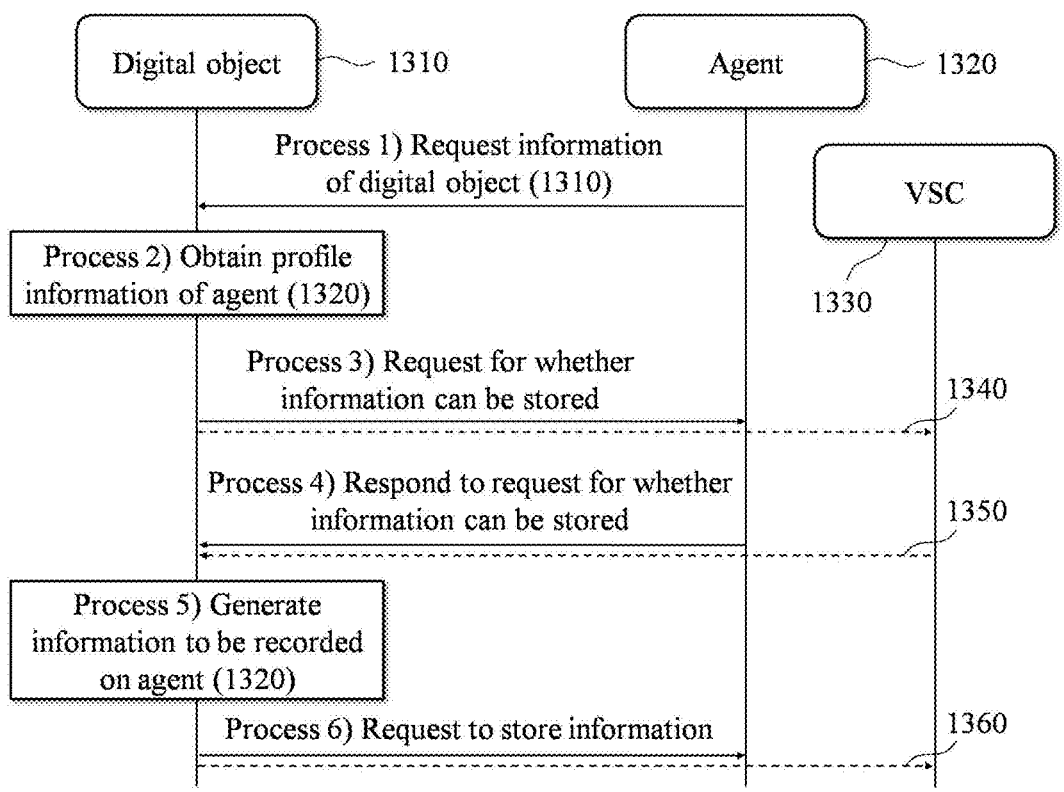
FIG. 13 is a flowchart illustrating an example of a process for the exchange of information between a digital object and an agent in an embodiment of the present disclosure.

FIG. 13 is a flowchart illustrating an example of a process for the exchange of information between a digital object and an agent in an embodiment of the present disclosure. FIG. 13 illustrates a digital object 1310, an agent 1320, and a VSC 1330 launched in accordance with the agent 1320. As described above, the digital object 1310 may be the terminal of a third party service provider that is substantially the owner of the digital object.

The agent 1320 may be substantially the terminal of a user.

A process 1) may be an example of a process for the agent 1320 to request information of the digital object 1310 from the digital object 1310. If the agent 1320 attempts to construct a space of a virtual world based on information of the digital object 1310 because the agent 1320 is adjacent to the digital object 1310 in the space of the virtual world or if the agent 1320 requires an interaction with the digital object 1310, process 1) may be performed by the agent 1320. In this case, the agent 1320 may transmit its profile to the digital object 1310 while requesting the information of the digital object 1310.

A process 2) may be an example of a process for the digital object 1310 to obtain profile information of the agent 1320. As described above, the agent 1320 may transmit its profile to the digital object 1310 while requesting the information of the digital object 1310 in the process 1). Accordingly the digital object 1310 may obtain the profile information of the agent 1320.

A process 3) may be an example of a process for the digital object 1310 to request, from the agent 1320, whether information on the agent 1320 can be stored. In this case, a first dotted-line arrow 1340 between the digital object 1310 and the VSC 1330 may mean that a request is transmitted through the VSC 1330 launched in accordance with the agent 1320 if the digital object 1310 cannot directly transmit the request to the agent 1320.

A process 4) may be an example of a process for the agent 1320 to respond to the request from the digital object 1310. In this case, a second dotted-line arrow 1350 between the digital object 1310 and the VSC 1330 may mean that the agent 1320 also transmits a response to the digital object 1310 through the VSC 1330 if the digital object 1310 transmits a request through the VSC 1330.

A process 5) may be an example of a process for the digital object 1310 to generate information to be recorded on the agent 1320. For example, the digital object 1310 may generate information to be stored in the agent 1320 based on the profile information of the agent 1320 obtained in the process 2).

A process 6) may be an example of a process for the digital object 1310 to store the information in the agent 1320. In this case, a third dotted-line arrow 1360 between the digital object 1310 and the VSC 1330 may mean that a request is transmitted to the VSC 1330 launched in accordance with the agent 1320 if the digital object 1310 cannot directly transmit the request to the agent 1320. In this case, information for which storage has been requested may be stored in the profile information of the agent 1320.

Accordingly, the digital object 1310 can use tracking features for the agent 1320 by obtaining the information stored in the profile information of the agent 1320 when the agent 1320 makes a visit subsequently.

Figure 14:
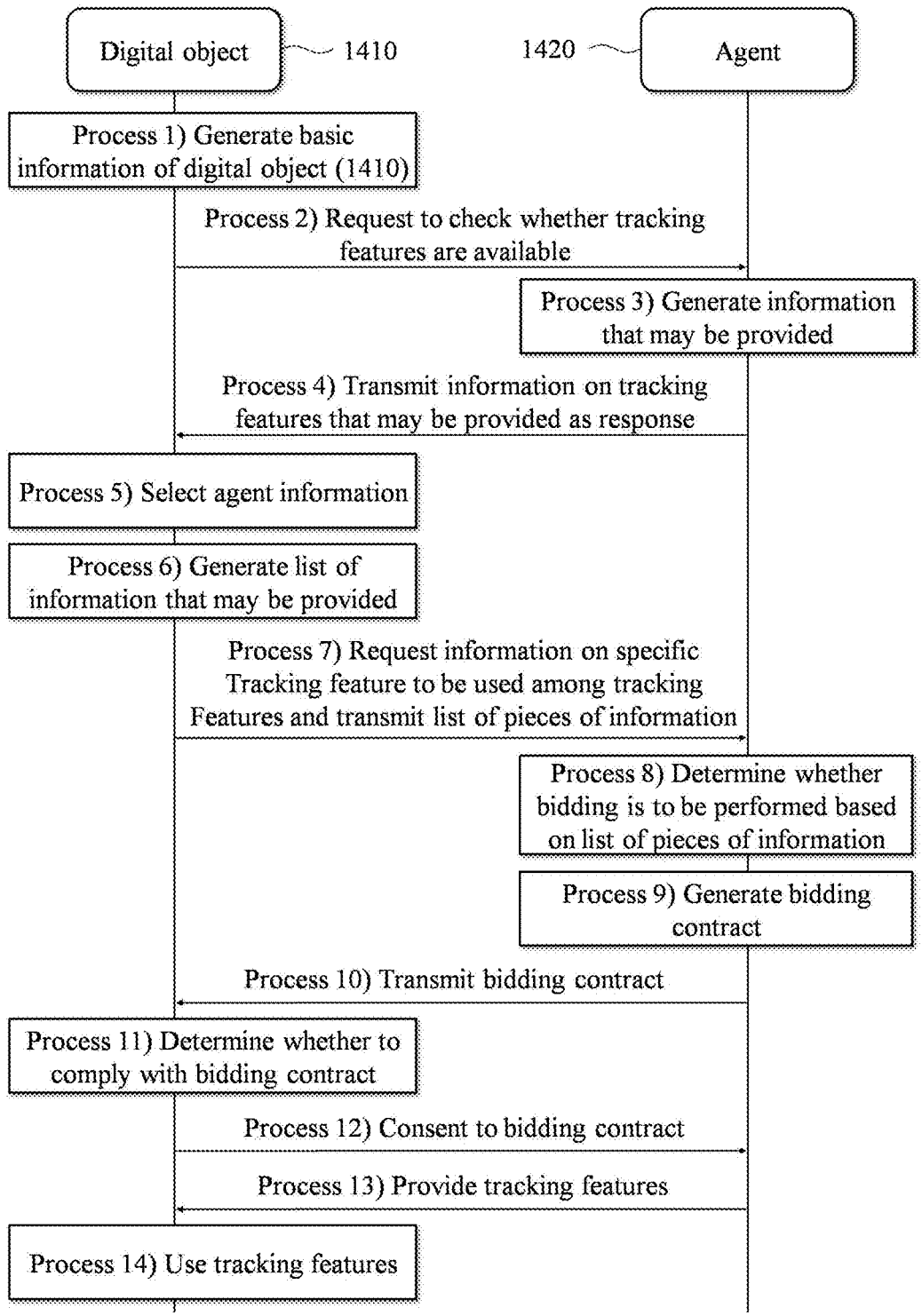
FIG. 14 is a flowchart illustrating another example of a process for the exchange of information between a digital object and an agent in an embodiment of the present disclosure.

FIG. 14 is a flowchart illustrating another example of a process for the exchange of information between a digital object and an agent in an embodiment of the present disclosure. FIG. 14 illustrates a digital object 1410 and an agent 1420. As described above, the digital object 1410 may be substantially the terminal of a third party service provider, that is, the owner of the digital object. The agent 1420 may be substantially the terminal of a user.

A process 1) may be an example of a process for the digital object 1410 to generate basic information of the digital object 1410.

A process 2) may be an example of a process for the digital object 1410 to request the agent 1420 to check whether the tracking features of the agent 1420 are available.

A process 3) may be an example of a process for the agent 1420 to generate information that may be provided. In this case, the information that may be provided may include the tracking features.

A process 4) may be an example of a process for the agent 1420 to transmit, to the digital object 1410, information on the tracking features that may be provided as a response. In this case, the response may include that the agent 1420 transmits, to the digital object 1410, a list of pieces of information on the tracking features that may be provided.

A process 5) may be an example of a process for the digital object 1410 to select agent information. For example, the digital object 1410 may select, as the agent information, a tracking feature to be used from the list of pieces of information on the tracking features transmitted by the agent as the response.

A process 6) may be an example of a process for the digital object 1410 to generate a list of pieces of information that may be provided by the digital object. Such a list may be a list of pieces of content that may be exposed to the agent 1420 by the digital object 1410. The list may be generated based on the basic information generated in the process 1) and the list of pieces of information on the tracking features transmitted in the process 4).

A process 7) may be an example of a process for the digital object 1410 to request, from the agent 1420, information on a specific tracking feature to be used among the tracking features and to transmit, to the agent 1420, the list of pieces of information that may be provided.

A process 8) may be an example of a process for the agent 1420 to determine whether bidding will be performed based on the list of pieces of information. For example, the agent 1420 may determine whether the progress of bidding (e.g., programmatic bidding) by the digital object 1410 using its tracking feature will be permitted.

A process 9) may be an example of a process for the agent 1420 to generate a bidding contract.

A process 10) may be an example of a process for the agent 1420 to transmit the bidding contract to the digital object 1410. To transmit the bidding contract may correspond to a case where the agent 1420 requests information and a cost necessary for the agent 1420.

A process 11) may be an example of a process for the digital object 1410 to determine whether to comply with the bidding contract.

A process 12) may be an example of a process for the digital object 1410 to transmit, to the agent 1420, consent to the bidding contract.

A process 13) may be an example of a process for the agent 1420 to provide the tracking features. After checking the consent to the bidding contract with the digital object 1410 transmitted in the process 12), the agent 1420 may transmit at least some of the tracking features to the digital object 1410 as agent information.

A process 14) may be an example of a process for the digital object 1410 to use the tracking features of the agent 1420. For example, the digital object 1410 may select content suitable for the agent 1420 through bidding using the tracking features. The selected content may be subsequently exposed to the agent 1420 in a space of a virtual world through a display area included in the digital object 1410. In this case, the bidding may be performed using the real-time content control module 950 included in the virtual space management system 841.

Figure 15:
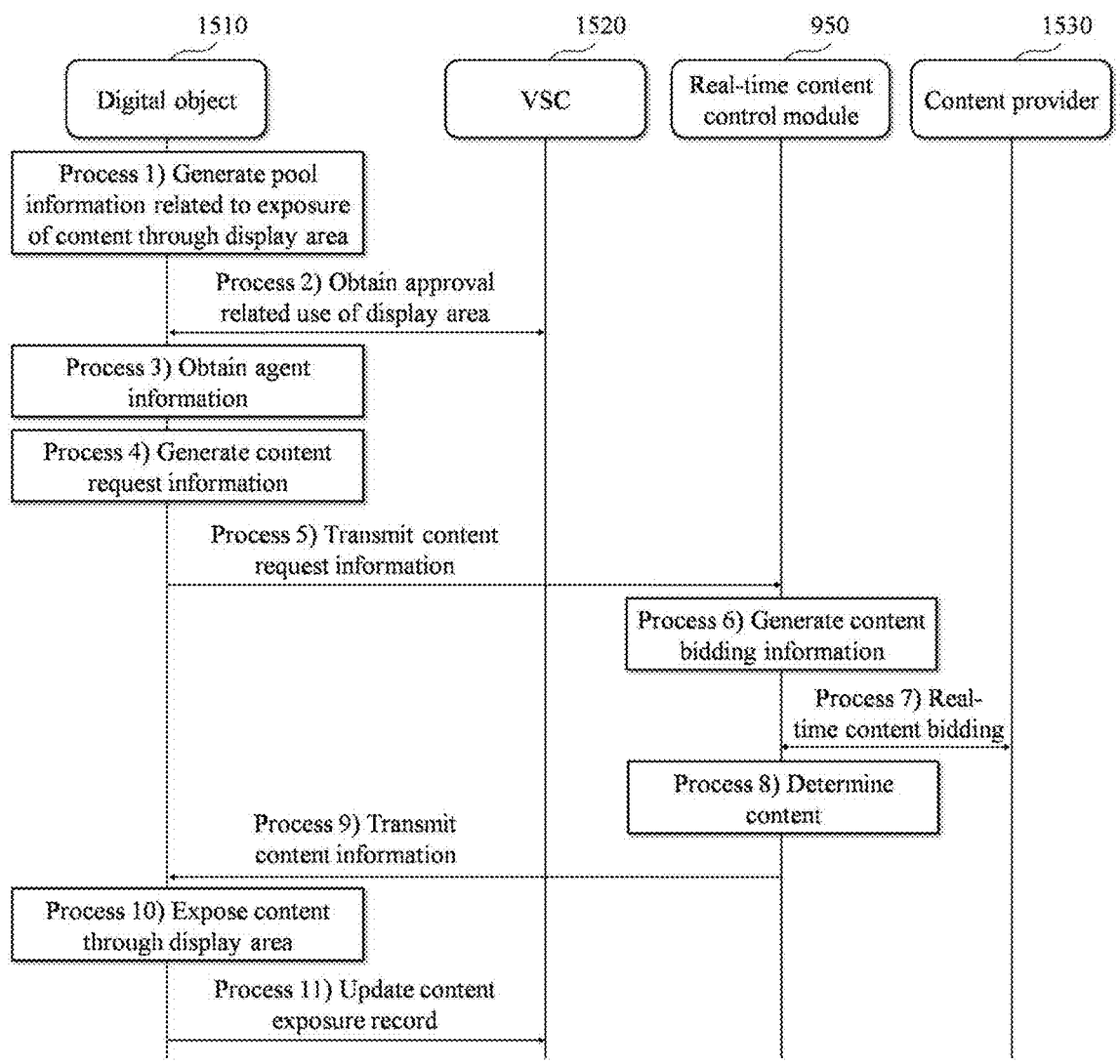
FIG. 15 is a flowchart illustrating an example of a process of selecting external content to be exposed in a display area in an embodiment of the present disclosure.

FIG. 15 is a flowchart illustrating an example of a process of selecting external content to be exposed in a display area in an embodiment of the present disclosure. FIG. 15 illustrates a digital object 1510, a VSC 1520, the real-time content control module 950 and a content provider 1530. In this case, the content provider 1530 may correspond to the third party display content provider 970 described with reference to FIG. 9, for example.

A process 1) may be an example of a process for the digital object 1510 to generate pool information related to the exposure of content through its display area. In this case, the pool information may include history information for pieces of content exposed by the digital object 1510 through the display area.

A process 2) may be an example of a process for the digital object 1510 to obtain approval related to the use of a display area from the VSC 1520.

A process 3) may be an example of a process for the digital object 1510 to obtain agent information. For example, an example of a process for the digital object 1410 to obtain information from the agent 1420 has been described with reference to FIG. 14.

A process 4) may be an example of a process for the digital object 1510 to generate content request information. For example, the content request information may be generated based on the pool information generated in the process 1) and the agent information obtained in the process 3).

A process 5) may be an example of a process for the digital object 1510 to transmit the content request information to the real-time content control module 950.

A process 6) may be an example of a process for the real-time content control module 950 to generate content bidding information. For example, the real-time content control module 950 may generate bidding information for target content to be displayed based on the content request information received from the digital object 1510.

A process 7) may be an example of a process for the real-time content control module 950 to perform real-time content bidding along with the content provider 1530.

A process 8) may be an example of a process for the real-time content control module 950 to determine content. For example, the real-time content control module 950 may determine content to be supplied to the digital object 1510 based on the real-time content bidding in the process 7).

A process 9) may be an example of a process for the real-time content control module 950 to transmit content information to the digital object 1510.

A process 10) may be an example of a process for the digital object 1510 to expose the content through the display area.

A process 11) may be an example of a process for the digital object 1510 to perform a content exposure record on the VSC 1520.

Information for constructing a space of a virtual world at timing of an agent is as follows. For example, a VSC may manage the following pieces of information (1) to (5) in order to construct a space of a virtual world for an agent.

(1) Policy for a space of a virtual world

A policy for a space of a virtual world may include basic information for constructing the space of the virtual world.

(2) World information

World information is location information in a space of a virtual world, and may provide a list of object areas, including information on the object areas present in a space of a corresponding virtual world, and GPS information in the space of the virtual world.

(3) View angle

A view angle may have each field of view (FoV) feature by incorporating the features of a space of a corresponding virtual world. The view angle may include information on verticality and horizontality, information on a view angle, and information on a zoom-in-out level.

(4) Object area information

Object area information may be used to provide a function for rapidly detecting an object area present in a space of a virtual world. The object are information may include the identifier of an object area and a list of digital objects.

(5) Digital object information

Digital object information may be used to provide a function for rapidly detecting whether content will be exposed through a display area present in a space of a virtual world. The digital object information may include the identifier of a digital object and a list of display area.

Contents that are considered upon tracking of an agent in a space of a virtual world include the following (1) to (5).

(1) Information transfer statistics based on a distance
(2) Information exposure intensity according to a field of view (FoV)
(3) Effectiveness upon exposure Effectiveness upon exposure may be used to determine the type (e.g., an image, an image and effect, video playback or a sound) of exposed content.

(4) Whether interaction is present

Whether an agent has actually interacted with digital objects and the interaction may be determined.

(5) Whether information is accumulated is determined based on a flow

To which level of data will be stored and exposed may be determined based on a flow.

Furthermore, the tracking features of an agent may include a trail for the behavior of an agent and a trail for an agent interaction.

The trail for the behavior of an agent may include information on a movement of the agent in a space of a virtual world. A movement of an agent may be basically restrictive in a space of a virtual world. For example, a movement of an agent may be restricted by personal information and privacy & terms upon movement between spaces of a virtual world. The trail for the behavior of the agent may include a pathway and a movement event as elements. The pathway may include information on a view angle, a field of view (FoV), a direction, speed and time (waiting time). The movement event may include information on skipping or jumping using a gate between spaces of a virtual world.

The trail for the interaction of an agent may include information on the identifier of an interaction object, the identifier of an interaction interface (e.g., visible/audible/handling), the type (e.g., video, an image, audio or an effect) of interaction, an interaction time and interaction intimacy. The handling may include an interface for an interaction object, such as a touch or kicking. Furthermore, the interaction intimacy may be scored based on the number of interactions, the time of an interaction, an interaction interface, or the intensity of exposure of surrounding information.

The owner of a digital object may purchase a tracking voucher in order to expose content through the display area of the digital object, and may purchase an interaction voucher in order to generate an interaction event with an agent through the digital object. In this case, a computer device that implements the digital object may identify rights according to the purchase of the voucher for using the tracking features of an agent related to the digital object. Content may be exposed in a space of a virtual world through a display area based on such rights as described in the embodiment of FIG. 15.

A digital object that has purchased a tracking voucher may have rights to the period in which the tracking features of an agent can be stored, the type of storage, and whether the tracking voucher can be combined with related information with respect to the agent. In other words, restriction may be applied so that only the owner of the digital object that has purchased the tracking voucher can obtain the tracking features of the agent.

The interaction voucher may be a voucher of a form in which a preset number of events is subtracted every interaction event occurring between a digital object and an agent. The interaction voucher may be differently billed based on the type of interaction or an interaction interface.

The owner of a digital object may obtain real-time intimacy information between the digital object and an agent through an interaction, and may obtain history information of an agent through a tracking feature.

As described above, according to the embodiments of the present disclosure, a space of a virtual world at agent timing can be constructed. Content based on a real-time behavior and/or interaction of an agent may be selected and provided based on the tracking features of the agent of a user in a space of a virtual world.

The aforementioned system or device may be implemented in the form of a hardware component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

A space of a virtual world at agent timing can be constructed.

Content based on a real-time behavior and/or interaction of an agent can be selected and provided based on the tracking features of the agent of a user in a space of a virtual world.

What is claimed is:

1. A method of constructing a virtual space, the method performed by a computer device comprising:
    obtaining, by at least one processor included in the computer device, world information for generating a space of a virtual world;
    determining, by the at least one processor, a location of an agent in the space of the virtual world;
    selecting, by the at least one processor, a digital object capable of being displayed to the agent in the space of the virtual world based on the world information and the location of the agent, the digital object including a display area for displaying content;
    determining, by the at least one processor, that the selected digital object includes the display area; and
    determining, by the at least one processor, whether to display the content through the display area based on a contract preset with respect to the display area,
    wherein, in response that the selected digital object acquires agent information on the agent from the agent, the content to be displayed through the display area is selected as agent-customized content based on the agent information, and in response that the selected digital object is not able to acquire the agent information from the agent, the content to be displayed through the display area is selected randomly.

2. The method of claim 1, wherein:
    the world information comprises a map for the space of the virtual world, information on an object area where the digital object is located, and information on the digital object located in the object area, and
    the world information further comprises at least one of policy information on the space of the virtual world and personal information and privacy & terms agreed with the space of the virtual world of the agent.

3. The method of claim 1, wherein:
    the agent moves between spaces of a virtual world using a gate formed between the spaces of the virtual world, and
    determining the location of the agent comprises determining the location of the agent based on information on a location of the gate when the agent invokes a space of a new virtual world using the gate.

4. The method of claim 1, wherein determining the location of the agent comprises loading the agent onto a location preferred by a user of the agent in a map for the space of the virtual world of the agent.

5. The method of claim 1, further comprising rendering, by the at least one processor, at least some area of the space of the virtual world based on at least one of a speed, direction and view angle of the agent at the location of the agent.

6. The method of claim 1, further comprising generating, by the at least one processor, a map for the space of the virtual world in a view of the agent.

7. The method of claim 1, further comprising checking, by the at least one processor, whether an interaction feature in a current view of the agent is used.

8. The method of claim 1, wherein selecting the digital object comprises:

selecting an object area capable of being displayed to the agent based on a location of the object area obtained based on the world information and the location of the agent; and checking a digital object located in the selected object area.

9. The method of claim 1, wherein the digital object comprises at least one of:
a display object exposed in a spatial form of the space of the virtual world,
an interactive object exposed in a spatial form in the space of the virtual world and capable of an interaction with the agent,
a web object of a form in which content in a web is exposed through the space of the virtual world, or
a streaming object of a form in which streaming content is continuously exposed.

10. The method of claim 1, wherein the digital object has one or more following functions based on a contract between the owner of the digital object and a supplier of the virtual space:
a function related to agent interoperation;
a function related to external API interoperation;
a function related to gate interoperation; or
a function related to the display area, and
wherein:
the function related to agent interoperation comprises:
an interaction function providing an interface that enables an agent's direct control;
a history function configured for tracking and storing information related to the visit and interaction of the agent;
an interested information storage function configured to enable the agent to store interested information for a digital object; or
a follow me function configured for making the digital object in an object area a small window or an icon so that the small window or icon follows near the agent;
the function related to external API interoperation comprises:
a function capable of sharing information on timing at which the digital object is generated and terminated in the virtual space;
an interface function configured to provide, to the outside, information related to the agent and collected by digital objects in an object area; or
an interface function configured to represent information on the digital object by incorporating real world information into the information;
the function related to gate interoperation comprises:
a gate connection function configured to connect the agent to another virtual space or physical space in a digital object present in an object area; and
the function related to the display area comprises:
a display area function in which the owner of the digital object may expose content; or
a display content request function configured to be supplied with external content through a real-time content module.

11. The method of claim 1, wherein the content to be displayed through the display area is selected further based on at least one of a first weight calculated based on content preference information set in the selected digital object and a second weight calculated based on interaction feedbacks for contents previously displayed through the display area.

12. A non-transitory processor-readable medium having instructions stored thereon, which when executed by one or more processors, cause the one or more processors to implement a method, comprising:
obtaining, by at least one processor included in the computer device, world information for generating a space of a virtual world;
determining, by the at least one processor, a location of an agent in the space of the virtual world;
selecting, by the at least one processor, a digital object capable of being displayed to the agent in the space of the virtual world based on the world information and the location of the agent, the digital object including a display area for displaying content;
determining, by the at least one processor, that the selected digital object includes the display area; and
determining, by the at least one processor, whether to display the content through the display area based on a contract preset with respect to the display area,
wherein, in response that the selected digital object acquires agent information on the agent from the agent, the content to be displayed through the display area is selected as agent-customized content based on the agent information, and in response that the selected digital object is not able to acquire the agent information from the agent, the content to be displayed through the display area is selected randomly.

13. The non-transitory processor-readable medium having instructions stored thereon of claim 12,
wherein the digital object has one or more of following functions based on a contract between the owner of the digital object and a supplier of the space of the virtual world:
a function related to agent interoperation;
a function related to external API interoperation;
a function related to gate interoperation; or
a function related to the display area, and
wherein:
the function related to agent interoperation comprises:
an interaction function providing an interface that enables an agent's direct control;
a history function configured for tracking and storing information related to the visit and interaction of the agent;
an interested information storage function configured to enable the agent to store interested information for a digital object; or
a follow me function configured for making the digital object in an object area a small window or an icon so that the small window or icon follows near the agent;
the function related to external API interoperation comprises:
a function capable of sharing information on timing at which the digital object is generated and terminated in the space of the virtual world;
an interface function configured to provide, to the outside, information related to the agent and collected by digital objects in an object area; or
an interface function configured to represent information on the digital object by incorporating real world information into the information;
the function related to gate interoperation comprises:
a gate connection function configured to connect the agent to another virtual space or physical space in a digital object present in an object area; and
the function related to the display area comprises:
a display area function in which the owner of the digital object may expose content; or a display content request function configured to be supplied with external content through a real-time content module.

14. A computer device comprising:
at least one processor implemented to execute an instruction readable by a computer,
wherein the at least one processor is configured to:
obtain world information for generating a space of a virtual world;
determine a location of an agent in the space of the virtual world;
select a digital object capable of being displayed to the agent in the space of the virtual world based on the world information and the location of the agent, the digital object including a display area for displaying content;
determine that the selected digital object includes the display area; and
determine whether to display the content through the display area based on a contract preset with respect to the display area,
wherein, in response that the selected digital object acquires agent information on the agent from the agent, the content to be displayed through the display area is selected as agent-customized content based on the agent information, and in response that the selected digital object is not able to acquire the agent information from the agent, the content to be displayed through the display area is selected randomly.

15. The computer device of claim 14, wherein:
the world information comprises a map for the space of the virtual world, information on an object area where the digital object is located, and information on the digital object located in the object area, and
the world information further comprises at least one of policy information on the space of the virtual world and personal information and privacy & terms agreed with the space of the virtual world of the agent.

16. The computer device of claim 14, wherein:
the agent moves between spaces of a virtual world using a gate formed between the spaces of the virtual world, and
the at least one processor is configured to determine the location of the agent based on information on a location of the gate when the agent invokes a space of a new virtual world using the gate.

17. The computer device of claim 14, wherein the at least one processor is configured to load the agent onto a location preferred by a user of the agent in a map for the space of the virtual world of the agent.

18. The computer device of claim 14, wherein the at least one processor is configured to render at least some area of the space of the virtual world based on at least one of a speed, direction and view angle of the agent at the location of the agent.

19. The computer device of claim 14,
wherein the digital object has one or more of following functions based on a contract between the owner of the digital object and a supplier of the space of the virtual world:
a function related to agent interoperation;
a function related to external API interoperation;
a function related to gate interoperation; or
a function related to the display area, and
wherein:
the function related to agent interoperation comprises:
an interaction function providing an interface that enables an agent's direct control;
a history function configured for tracking and storing information related to the visit and interaction of the agent;
an interested information storage function configured to enable the agent to store interested information for a digital object; or
a follow me function configured for making the digital object in an object area a small window or an icon so that the small window or icon follows near the agent;
the function related to external API interoperation comprises:
a function capable of sharing information on timing at which the digital object is generated and terminated in the space of the virtual world;
an interface function configured to provide, to the outside, information related to the agent and collected by digital objects in an object area; or
an interface function configured to represent information on the digital object by incorporating real world information into the information;
the function related to gate interoperation comprises:
a gate connection function configured to connect the agent to another virtual space or physical space in a digital object present in an object area; and
the function related to the display area comprises:
a display area function in which the owner of the digital object may expose content; or
a display content request function configured to be supplied with external content through a real-time content module.

* * * * *